Oct. 1, 1957  B. CAMPRUBI  2,807,867
ELECTRIC MOTORS

Filed June 22, 1951  3 Sheets-Sheet 1

INVENTOR.
Bartholomew Camprubi
BY
Harry S. Durasse
ATTORNEY.

INVENTOR.
Bartholomew Camprubi

United States Patent Office 2,807,867
Patented Oct. 1, 1957

2,807,867

ELECTRIC MOTORS

Bartholomew Camprubi, Perivale, Greenford, England, assignor to The Hoover Company, North Canton, Ohio, a corporation of Ohio Application June 22, 1951, Serial No. 232,922

Claims priority, application Great Britain January 8, 1951

3 Claims. (Cl. 29—155.54)

The present invention relates to electric motors and more particularly to molded commutators therefor and to the method of making the same.

It is known to form a commutator ring with anchoring tails extending inwardly from the segments and to mold insulating material about the tails of the segments to anchor them in place. With commutators made in that manner the segments sometimes break away from the insulating material at high peripheral speeds.

That is especially true of the insulating materials having better electrical characteristics such as the melamine and alkyd resins.

According to the present invention a plurality of discs of thin fabric are integrally molded to each other about the anchoring tails of the segments and fill the entire space between the segments and the shaft with which the commutator is to be used.

Specifically, according to the present invention, thin sheets of a fabric such as cotton, asbestos, etc., are impregnated with an insulating resin preferably in the form of a varnish or in other liquid form. The insulating material should be one which can be cured by the application of pressure and/or heat and is preferably a melamine or alkyd resin. Those materials have excellent electrical properties, being good insulators, having high dielectric strength and being heat resistant, moisture resistant and arc resistant.

Discs are stamped from the impregnated sheets, the discs having an outside diameter substantially the same as the inside diameter of the commutator at the base of the anchoring tails and an inside diameter substantially the same as the outside diameter of the shaft with which the commutator is to be used.

A copper ring having the segments joined by a solid ring of copper and having inwardly extending anchoring tails is then placed in a mold cavity having an inside diameter the same as the outside diameter of the ring. A multiplicity of the discs of impregnated fabric are then stacked on top of the anchoring tails being held in position by being placed over a fixed pin extending upwardly in the mold cavity, the pin having an outside diameter the same as the inside diameter of the discs.

The discs are then forced downwardly into the ring under high pressure by a plunger having an outside diameter to slidably fit the mold cavity. The anchoring tails will cut through the material of the discs adjacent their periphery, the material being pushed aside into the space between adjacent anchoring tails so that the material will be more highly compacted in that region. The high pressure and the heat thus produced will cause the impregnating resin to soften and flow into the interstices of the fabric disc and be cured into a solid compact mass. For melamine and alkyd resins additional heat is necessary to cure the resin and the mold cavity may be additionally heated. If desired, voids may be provided in the discs for the addition of additional insulating material. That may be done by punching small openings through the discs outwardly of their central openings.

The copper ring with the insulating material molded about the anchoring tails is then removed from the mold cavity and saw cuts taken through the copper ring to separate adjacent segments from each other.

It has been found that according to the present invention the sleeve usually molded on the interior of the insulating material during the molding operation may be omitted since the finished commutator is strong enough to be press fitted directly to the shaft with which it is to be used.

Other objects and advantages of the present invention will become apparent as the description proceeds when taken in connection with the accompanying drawings in which.

Figure 1:
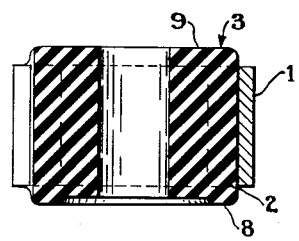
Figure 1 is a cross-sectional view, taken on line 1—1 of Fig. 2, of the commutator made according to the present invention.
Figure 2:
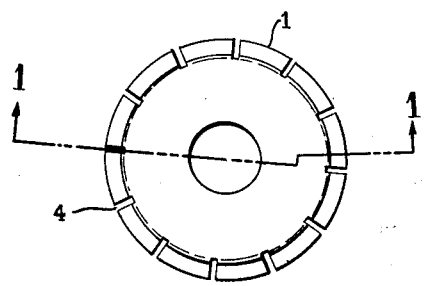
Figure 2 is an end view of the commutator of Fig. 1.
Figure 3:
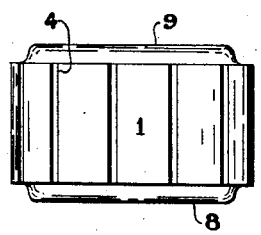
Figure 3 is a side view of the commutator of Fig. 1.
Figure 4:
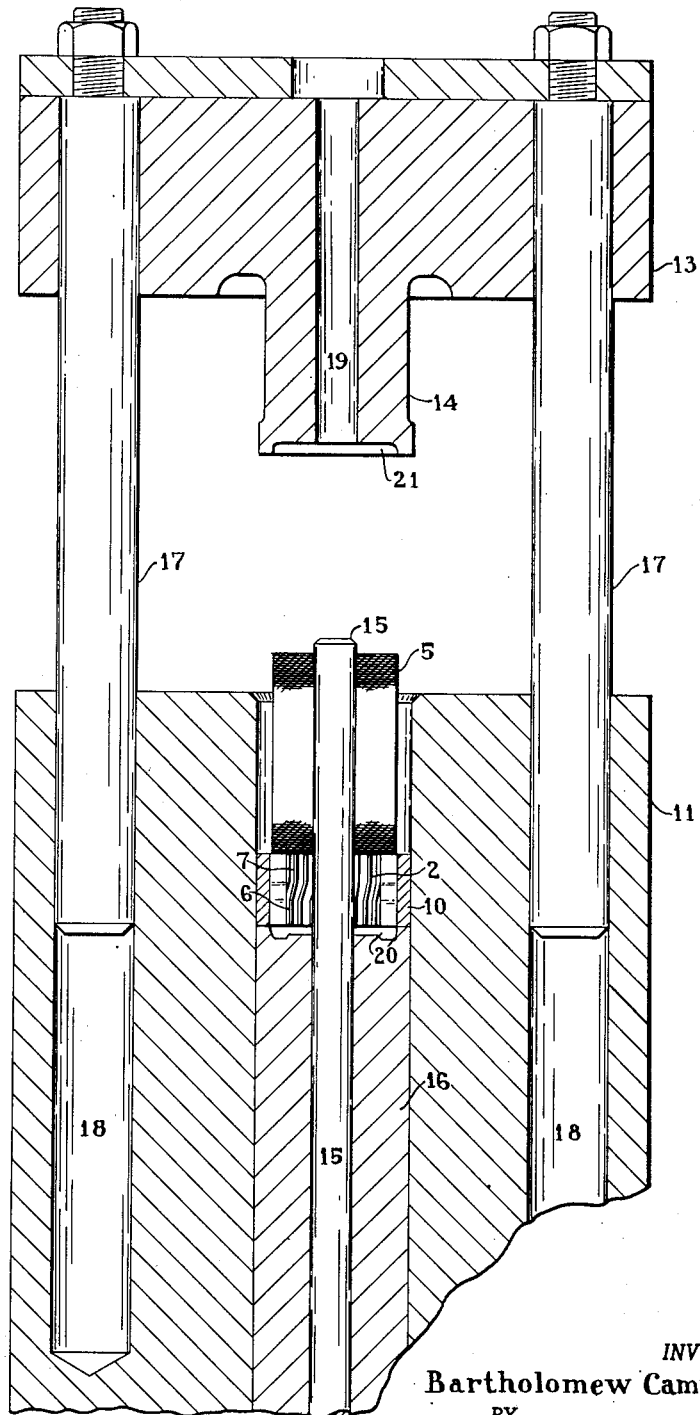
Figure 4 shows a mold with a copper ring therein and the impregnated discs stacked thereon previous to the molding operation.

Figs. 1 to 3 show the completed commutator of the present invention, in the form of a plurality of segments 1 having anchoring tails 2, integrally molded into a core 3 of an insulating material and separated by narrow saw cuts 4. The insulating core is made up of a plurality of discs 5 of thin fabric impregnated with a heat and pressure moldable synthetic resin such as a melamine or alkyd resin molded under heat and pressure to form the core 3. The opposite ends of the anchoring tails 2 are bent in opposite directions as shown at 6 and 7 (Fig. 4). The core 3 extends beyond the ends of the segments 1 as shown at 8 and 9.

According to the method of the present invention a copper ring 10 (Fig. 4) is formed in any suitable manner, such as by the method disclosed in the United States patent to Wilson 2,320,541, dated June 1, 1943.

Sheets of a thin textile or asbestos fabric are impregnated with a synthetic resin, for example, a melamine resin or an alkyd resin, both of which have good insulating properties, being good insulators, being heat, moisture and arc resistant and having high dielectric strength.

The resin may be applied to the fabric in the form of a varnish or in any other suitable manner.

The discs 5 are then stamped from the impregnated sheets, the internal diameter of the discs 5 being substantially the same as the outside diameter of the shaft to which the finished commutator is to be applied and the outside diameter being substantially the same as the inside diameter of the ring 10 at the base of the anchoring tails 2.

Figure 5:
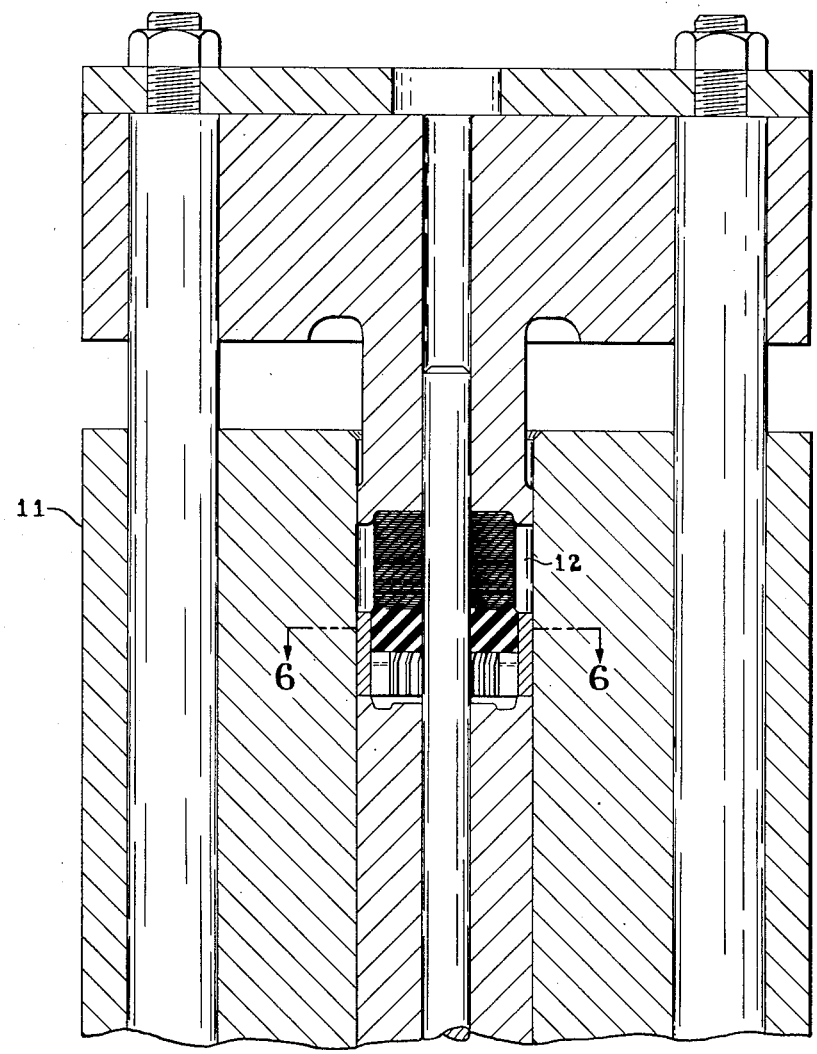
Figure 5 shows the mold of Fig. 4, with the copper ring and the impregnated discs in the position they occupy with the mold partly closed.
Figure 6:
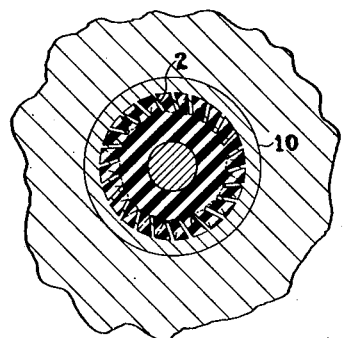
Figure 6 is a transverse cross-sectional view taken through the mold and partially completed commutator on line 6—6 of Fig. 5.

A mold for molding the discs 5 into the ring 10 may take any suitable form. As shown in Figs. 4 and 5 it comprises a bed 11 formed with a mold cavity 12, a reciprocating head 13 having a plunger 14 adapted to enter the mold cavity 12, a central fixed forming pin 15 and a reciprocating ejector plunger 16 within the mold cavity 12 and surrounding the pin 15. The head 13 is guided for reciprocation relative to the base 11 by a pair of guide rods 17, secured to the head 13 at their upper ends and at their lower ends reciprocating in bores 18 in the base 11. The head 13 and the plunger 14 are provided with a bore 19 for receiving the pin 15 which also acts as a guide. The upper end of the ejector pin 16 has a cavity 20 and the lower end of plunger 14 has a cavity 21 for forming the projecting ends 8 and 9 of the core 3.

A suitable number of discs 5 are stacked over the forming pin 15 to rest on the tails 2 of the ring 10. The number of discs will vary depending upon the fabric used, its thickness, the length of the ring 10 and the impregnating resin used. Using a melamine resin, a textile material of about 0.008 inch in thickness in their free state and a ring about ½ inch long, it has been found that about 200 of the discs will be sufficient.

With the parts in the position shown in Fig. 4 the head 13 is brought down with great force on top of the disc 5. The high pressure will progressively force the tails 2 through the outer edges of the discs and the material will be displaced to the sides of the tails and between adjacent tails so as to be highly compacted in that region. The heat and pressure will cause the impregnating material to soften and flow into the interstices of the fabric and be cured into a solid compact mass. For melamine and alkyd resins additional heat is necessary to cure the insulating material and therefore the mold cavity may be additionally heated.

When the molding operation is completed the plunger 16 is operated to eject the ring 10 with its molded core from the mold cavity after which saw cuts may be taken through the metal of the ring, to form adjacent segments 1 as shown in Fig. 2, it being noted that the saw cuts extend slightly into the insulating core 3.

While I have shown and described but a single embodiment of my invention it is to be understood that that embodiment is to be taken as illustrative only and not in a limiting sense. I do not wish to be limited to the particular structure and method shown and described but to include all equivalent variations thereof except as limited by the scope of the claims.

I claim:

1. The method of making a commutator comprising; placing a solid copper ring having inwardly projecting anchoring tails in a mold cavity having an inside diameter the same as the outside diameter of said ring; forming fabric discs impregnated with a heat and pressure curable insulating material and having an outside diameter the same as the inside diameter of said ring at the base of said anchoring tails and an inside diameter substantially the same as the outside diameter of the shaft with which the commutator is to be used; stacking a multiplicity of said discs on said ring with their outer edges resting on said anchoring tails; applying sufficient pressure to the stack of discs to force said tails through the material of said discs at their edges, to cause the impregnating material to soften and flow into the interstices of the discs and to cause said impregnating material to be at least partially cured while holding the inside diameter of said disc constant; and severing the ring to form a plurality of segments.

2. The method of making a commutator comprising; forming a solid ring of copper having inwardly projecting anchoring tails; forming fabric discs impregnated with a settable insulating binding material and having an outside diameter the same as the inside diameter of said ring at the base of said anchoring tails; stacking a multiplicity of said discs on said ring with their edges resting on said anchoring tails; and applying sufficient pressure to the top of said stack to force said anchoring tails through the material of said discs at their edges, to cause the impregnating material to flow into the interstices of said discs and to bond them into an integral mass.

3. The method of making a commutator comprising; forming a solid ring of copper with anchoring tails extending radially inwardly therefrom; impregnating thin sheets of textile material with heat and pressure curable insulating bonding material; stamping a plurality of discs from said sheets having an outside diameter substantially the same as the inside diameter of said ring at the base of said anchoring tails; stacking a plurality of said discs on said ring with their edges overlying said anchoring tails; applying a high pressure to said stack of discs sufficient to compact them, force them into said ring, cause said anchoring tails to pierce the material of the edges of said discs and displace the material between adjacent anchoring tails and to cure said bonding material; and severing the material of said ring to form adjacent segments.

References Cited in the file of this patent

UNITED STATES PATENTS

| | | |
|---|---|---|
| 1,195,861 | Smith | Aug. 22, 1916 |
| 1,319,988 | Blumberg | Oct. 28, 1919 |
| 1,393,878 | Apple | Oct. 18, 1921 |
| 1,641,414 | Critchfield | Sept. 6, 1927 |
| 1,898,929 | Apple | Feb. 21, 1933 |
| 1,994,062 | Bonanno | Mar. 12, 1935 |
| 2,104,141 | Stevens | Jan. 4, 1938 |
| 2,320,541 | Wilson | June 1, 1943 |
| 2,348,511 | Armel | May 9, 1944 |
| 2,516,880 | Isaacson | Aug. 1, 1950 |
| 2,541,047 | Frisbie | Feb. 13, 1951 |